United States Patent [19]

Hugg

[11] 4,341,268

[45] Jul. 27, 1982

[54] PLOUGH FOR WORKING EARTH BETWEEN PLANT ROW

[76] Inventor: Julien Hugg, 7, route du Vin, Bergheim (Haut-Rhin), France

[21] Appl. No.: 122,379

[22] Filed: Feb. 19, 1980

[30] Foreign Application Priority Data

Feb. 19, 1979 [FR] France ............................... 79 04916

[51] Int. Cl.³ ............................................... A01B 13/04
[52] U.S. Cl. ........................................ 172/5; 172/190;
172/605; 172/677; 280/478 R
[58] Field of Search ........................ 172/2, 5, 6, 26, 38,
172/233, 234, 235, 190, 641, 647, 651, 652, 653,
654, 677, 678, 706; 280/478 R, 478 A, 478 B

[56] References Cited

U.S. PATENT DOCUMENTS

| | | | |
|---|---|---|---|
| 900,981 | 10/1908 | Chilson | 172/5 |
| 1,739,327 | 12/1929 | Reynolds | 172/652 |
| 2,966,217 | 12/1960 | Padrick | 172/605 X |
| 3,019,032 | 1/1962 | Oehler et al. | 280/478 B |
| 3,228,483 | 1/1966 | Fleck et al. | 172/38 |
| 3,384,391 | 5/1968 | Batke | 280/478 B |

FOREIGN PATENT DOCUMENTS

| | | | |
|---|---|---|---|
| 628853 | 7/1927 | France | 172/652 |
| 1097099 | 2/1955 | France | 172/5 |
| 1151193 | 8/1957 | France | 172/234 |
| 1408887 | 7/1965 | France | 172/5 |
| 536769 | 12/1976 | U.S.S.R. | 172/190 |
| 604526 | 4/1978 | U.S.S.R. | 172/190 |
| 634700 | 11/1978 | U.S.S.R. | 172/5 |

*Primary Examiner*—Richard T. Stouffer
*Attorney, Agent, or Firm*—Young & Thompson

[57] ABSTRACT

A plough for working between rows in a plantation comprises a chassis with pivotally-mounted, laterally-movable members having arms to carry earth-working tools. Movably connected to the chassis are curved sensors to contact the plants in two rows between which the plough is operating. There is a guide device for automatically centering the plough between the two rows, and there is a control including double-acting hydraulic rams for shifting the laterally-movable members to suit the width between the rows.

6 Claims, 5 Drawing Figures

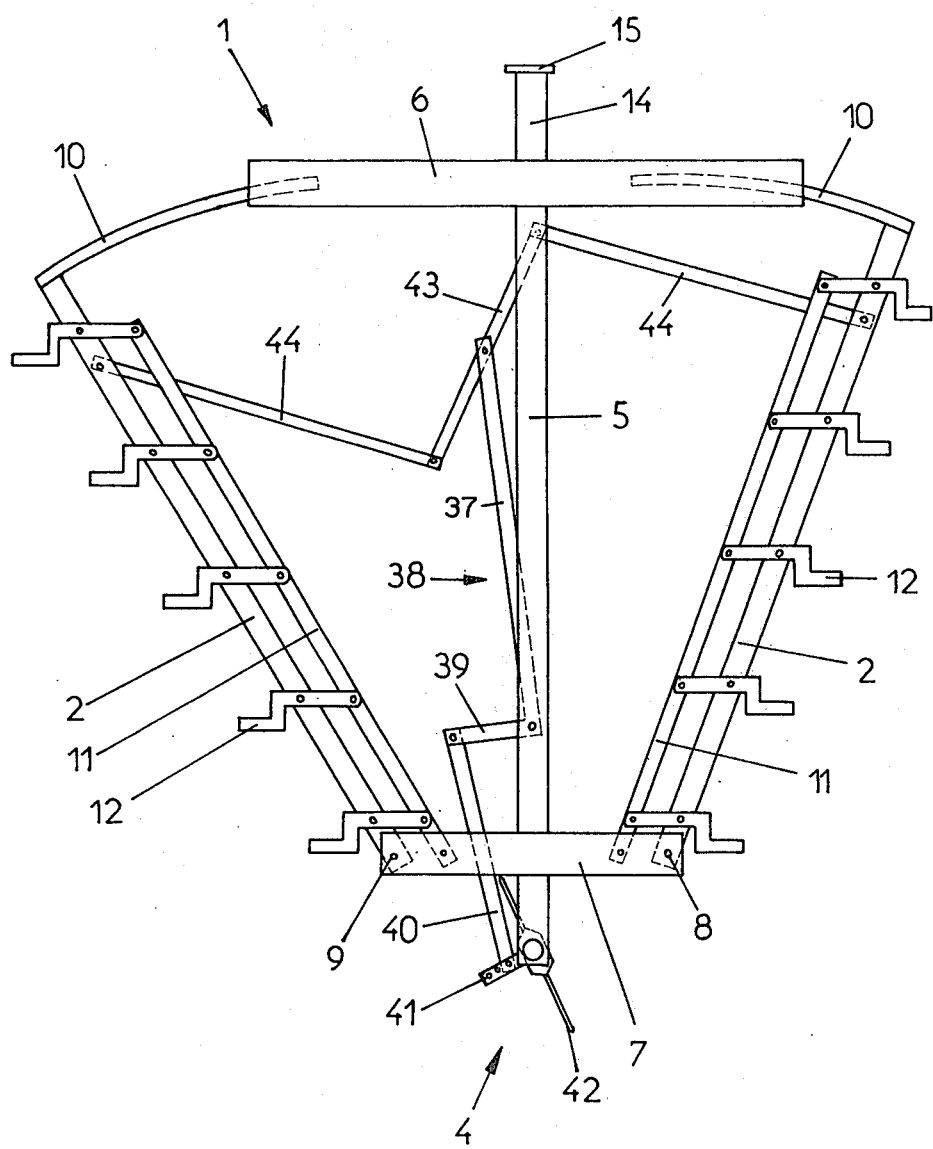

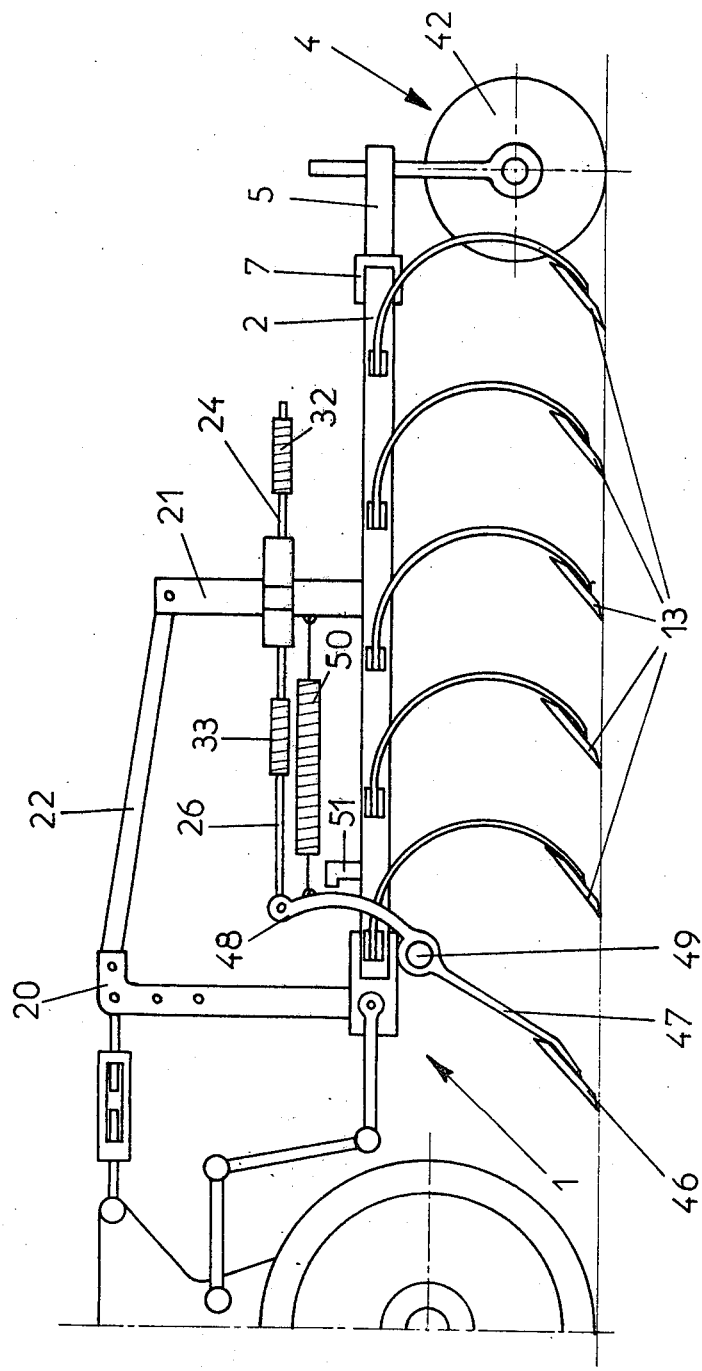

PLOUGH FOR WORKING EARTH BETWEEN PLANT ROW

INTRODUCTION AND BACKGROUND OF THE INVENTION

The present invention is concerned with the field of the design of agricultural equipment, especially for viticulture and arboriculture, and has as its object a plough for working the earth, especially in plantations in rows.

At present the working of the earth situated between the plants of a plantation row, such as vine stocks, fruit trees or the like, is generally effected by means of clearing implements or similar ploughs.

These clearing implements or ploughs permit correct working of the earth between two plantation rows. However to carry out this work, clearing implements are most frequently equipped with costly devices for guidance between the rows. Furthermore these clearing implements and ploughs generally have appreciable bulk in the width direction and are difficult to centre when working on sloping terrain.

The present invention has the purpose of alleviating these drawbacks.

BRIEF SUMMARY OF THE INVENTION

The invention provides a plough for working the ground especially in plantations in rows, constituted essentially by a transporting and working chassis, by tool-carrying lateral members which can be opened out and folded up under the action of a control device, and by a device for automatic centering of the plough.

FURTHER DESCRIPTION AND ADVANTAGES OF THE INVENTION

The invention and its advantages will be better understood from the following description relating to preferred forms of embodiment which are given by way of non-illustrative example and explained with reference to the accompanying drawings.

BRIEF DESCRIPTION OF THE VIEWS IN THE DRAWINGS

FIG. 4 is a plan view of the plough, representing the operation of the centring device; and FIG. 5 represents a variant of embodiment of the device for opening out and folding the tool-carrying lateral members.

DETAILED DESCRIPTION OF THE PREFERRED EMBODIMENT

Figure 1:
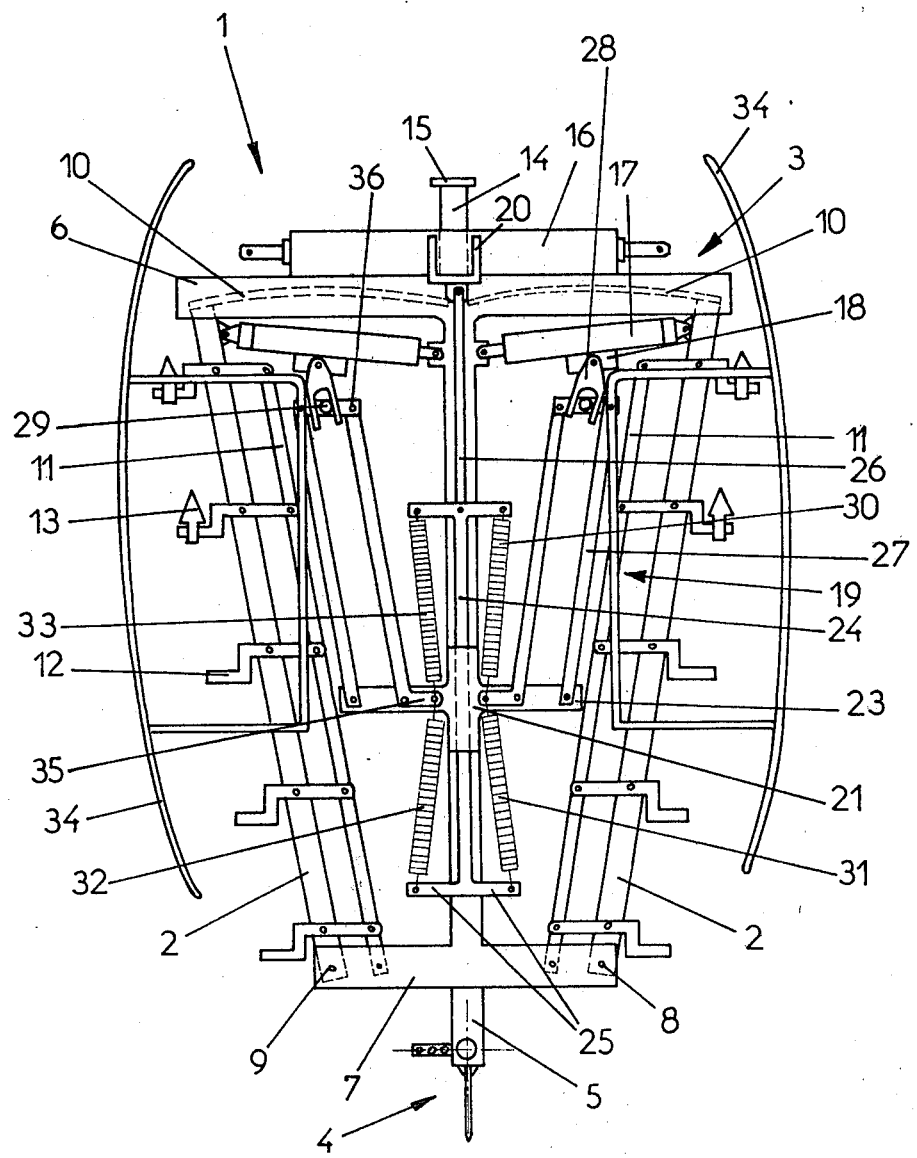
FIG. 1 is a plan view of a plough according to the invention, in the folded-up position.

In accordance with the invention and as shown more particularly by way of example by FIG. 1 of the accompanying drawings, the plough for working the ground especially in row plantations is constituted essentially by a transporting and working chassis 1, by tool-carrying lateral members 2 which can be opened out and folded up under the action of a control device 3, and by a device 4 for the automatic centering of the plough.

The chassis 1 is constituted by a central beam 5 equipped at its forward part with a U-shaped cross-member 6 and at its rear part with another U-shaped cross-member 7 shorter than the member 6. The tool-carrying lateral members 2 are secured pivotably at 8 and 9 on this cross-member 7, and are provided at their free extremities with a piece 10 of circular arc form which can slide in the U-shaped lodgement of the cross-member 6 when the lateral members 2 carry out pivoting movements.

Parallel with the lateral members 2, two arms 11 are mounted on the cross-member 7, one on each side of the beam 5, and are articulatedly connected to the lateral members 2 through the intermediary of link rods 12 the free extremity of each of which serves for the removable fixing of an earthworking tool 13, such as a share, a disc, a tine, a weeding spray beam or the like. The link rods 12 extend perpendicularly of the beam 5, when the plough is in the folded position (FIG. 1) and their number is a function of the size of the chassis 1 and thus of the working width of the plough. These link rods 12 with the lateral members 2 and the arms 11 form a series of regular deformable parallelograms, so that however far the lateral members 2 are opened out in relation to the beam 5, the link rods 12 are always perpendicular to the said beam 5 and the tools 13 are always parallel to one another.

At the forward part of the plough the beam 5 is prolonged by a pivot 14 equipped with a stop 15, upon which the hitch bar 16 can move longitudinally and pivot. The movement of the hitch bar 16 is rearwardly limited by the crossmember 6.

The device 3 for controlling the folding and opening-out of the lateral members 2 and their position in relation to the plants of the rows is constituted by two double-acting hydraulic rams 17 each actuated through the intermediary of a hydraulic distributor 18, and by an assembly 19 for the control of the distributors 18.

The hydraulic rams 17 are articulatedly mounted symmetrically between the beam 5 and the forward extremity of each lateral member 2 close to the arcuate part 10. These rams 17 are each actuated through the intermediary of a hydraulic distributor 18 controlled by an assembly 19 constituted by a movable bracket 20 of the chassis 1 fast with the hitch bar 16, by a fixed bracket 21 connected by a bar 22 to the bracket 20, fast at its other extremity with the beam 5 and equipped with two fixed arms 23, by a bar 24 which can slide in the bracket 21, is equipped at its extremities with arms 25 and is connected to the bracket 20 by a rod 26, by two parallelograms 27 each co-operating with a fork 28 for actuation of the distributors 18 by means of a roller 29, by four springs 30 to 33 acting upon the parallelograms 27, and by sensors 34 articulatedly fixed upon the said parallelograms 27.

Each parallelogram 27 is pivotally mounted on an arm 23 of the fixed bracket 21 and is equipped, on its inner longitudinal arm, with a link rod 35 integral with this arm, and upon the extremity of which a pair of springs acts, namely upon that of the right-hand parallelogram the springs 30–31 act and upon that of the left-hand parallelogram the springs 33–32 act, these springs being fixed at their other ends respectively at the front and rear of the bar 24 to the arms 25.

On the side opposite to the arms 25 the parallelograms 27 are each equipped, on the arm 36, with a roller 29 which co-operates with a fork 28 constituting the actuating lever of the distributor 18 of the ram 17 (FIG. 1).

The automatic centering device 4 is constituted by an L-angled element 38, the shorter side 39 of which is connected by means of a bar 40 to a lever 41 fast with the vertical spindle of a disc 42 and pivotally fixed at the level of its angle upon the beam 5, by a middle bar 43 articulated at its middle on the element 38, and by two connection bars 44 articulatedly mounted on the lateral members 2 close to their elements 10, and upon the middle bar 43.

Figure 3:
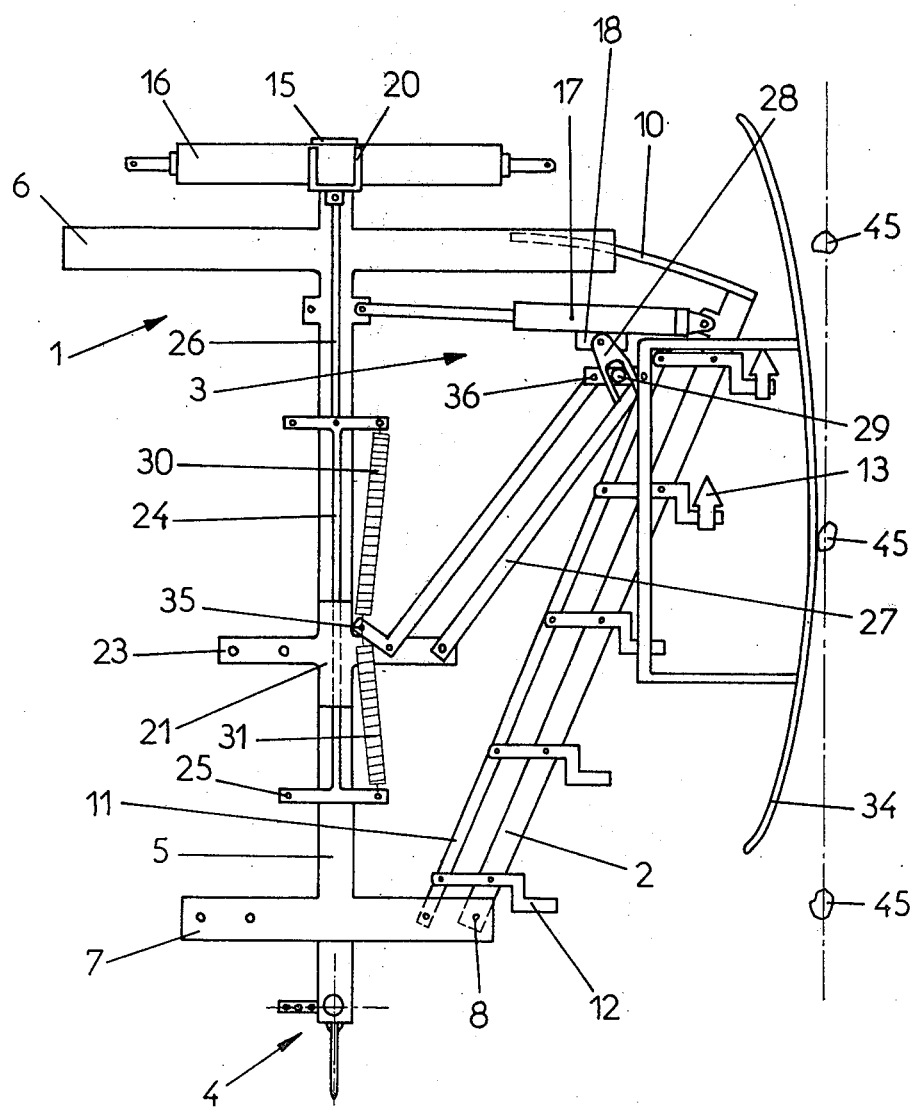
FIG. 3 is a partial plan view of the plough according to FIG. 1 in the opened-out position.

The plough according to the invention operates in the following manner:

In the working position the plough, connected in known manner to a tractor three-point hitch, rests with its tools 13 on the ground, and the said tools drive themselves into the ground when the tractor moves forward. The hitch bar 16 is then displaced on the pivot 14 in relation to the beam 5 until it abuts against the stop 15. In this movement the bar 16, through the movable bracket 20 entrains the rod 26 and the bar 24 so as to tension the springs 30 and 33 (FIG. 3) which pull upon the link rods 35 of the inner arms of the parallelograms 27, the springs 31 and 32 then being relaxed. Then the link rods 35 pivot forward, causing a deformation of the parallelograms in the direction of removal of their forward parts from the beam 5. The rollers 29 of the parallelograms 27 then cause the actuating forks 28 of the distributors 18 to pivot and these in turn actuate the rams 17. The latter expand entraining the lateral members 2, the arms 11 and the link rods 12 until the sensors 34 fast with the parallelograms 27 come to abut against the plants 45 of a plantation row. When this abutment occurs the roller 29 acts in the opposite direction upon the fork 28 of the distributor 18, which moves to the dead point and halts the extension of the ram 17.

In the case of an increase of the pressure upon the sensors 34, due for example to a narrowing of the plantation rows or to another obstacle, the rollers 29 pivot the forks 28 towards the beam 5, so that the rams retract, entraining the lateral members 2 and thus the tools 13.

When the tractor driver arrives at the end of a plantation row and lifts the plough, the chassis assembly 1 slides towards the hitch bar 16 and especially the pivot 14 slides within the bar 16 until the forward cross-member 6 abuts against the said bar 16. Then a converse displacement of the device 3 occurs which has the consequence of causing a tension of the springs 31–32 favouring folding of the lateral members 2 by converse displacement of the rams 17.

When the plough is working upon flat terrain, the lateral members 2 are equidistant from the beam 5 and the long side 37 of the element 38 of the automatic centering device 4 is aligned with the beam 5. On the other hand, on terrain having a great slope, if the plough side-slips for example towards the right, as represented in FIG. 4, the lateral member 2 of the side concerned approaches the beam 5, while the other lateral member 2 departs therefrom. The connection bars 44 then act in thrust and traction upon the middle bar 43 which they displace, in common with the end of the element 38, to the left. The element 38 then causes the disc 42 to deviate, by means of the bar 40 articulated to the short side 39. As the disc 42 is driven into the ground and is guided by its vertical spindle in the beam 5, it tends to impart a thrust to the left to the chassis in order to shift parallel to the direction of advance of the plough. As the disc 42 returns to the position parallel with the beam 5, the element 38 is again brought into coincidence with the beam 5 by its long side 37, and the lateral members 2 are once again symmetrical in relation to the beam 5. This centering is carried out in identical manner for a slide-slip to the left, the disc 42 then having a tendency to displace the chassis 1 towards the right.

Figure 2:
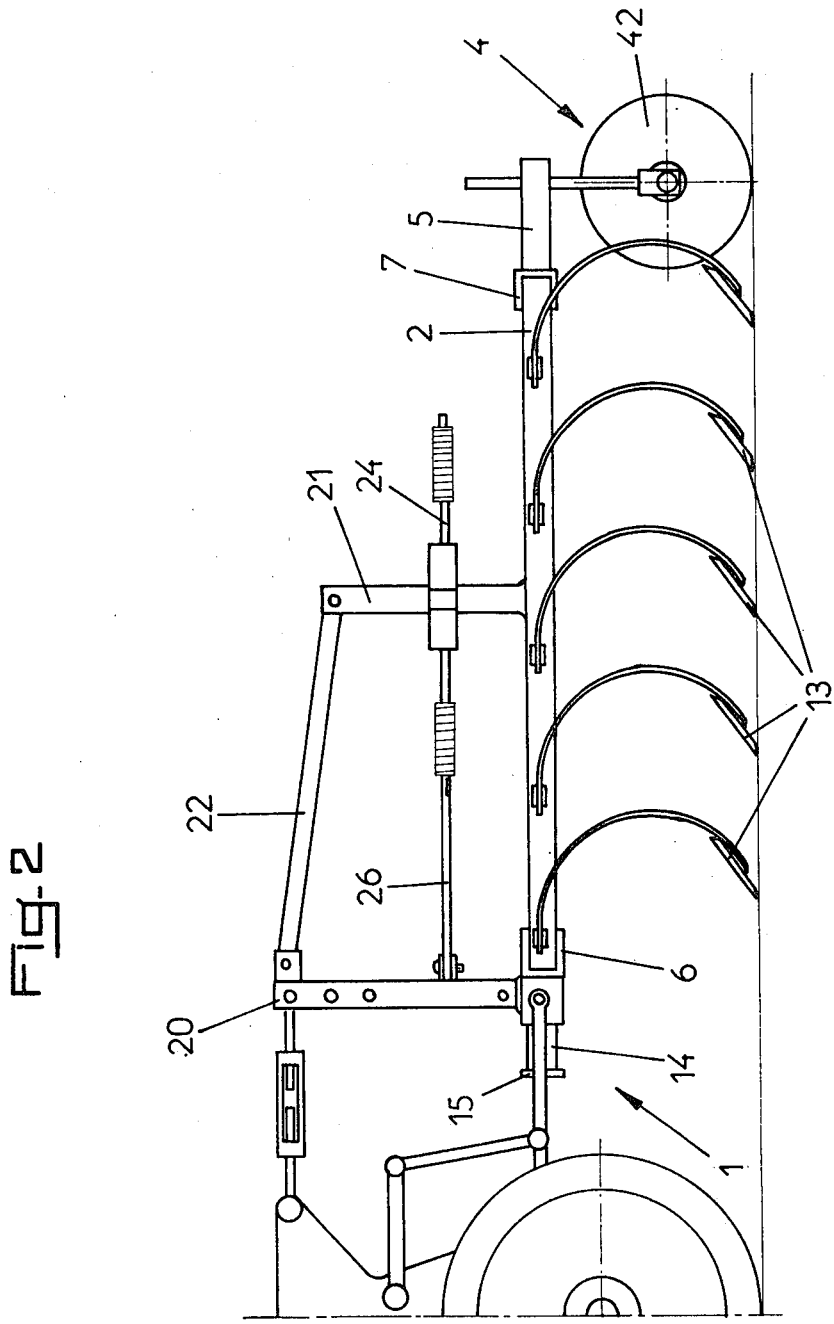
FIG. 2 is a lateral elevation of the plough according to FIG. 1.

According to a variant of embodiment of the invention, and as shown more particularly in FIG. 5, the opening out and folding of the lateral members 2 can also be effected by means of an agricultural tool 46, such as a spade, a share or the like, acting upon the rod 26 and the bar 24 in place of the movable bracket as represented in FIG. 2. To this end the tool 46 is mounted on a pillar 47 articulated to the beam 5 at 49 and provided with a lever 48 connected to the rod 26. Upon the lever 48 there acts a return spring 50 connected at its other end to the bracket 21 and pulling upon the said lever 48 to apply it against a stop 51 and tension the springs 31 and 32, in the inoperative position of the plough. In the working position the plough is drawn by the tractor and the tools 13 and 46 drive themselves into the ground and cause a resistance to forward motion which tends to pivot the said tools towards the rear. As the tool 46 is mounted movably, through the intermediary of the pillar 47, upon the beam 5 it rocks to the rear and the lever 48 pulls upon the rod 26, against the action of the springs 50, 30 and 33, causing a relaxation of the springs 31 and 32. This traction of the lever 48 upon the rod 26 has the effect of causing the lateral members 2 to open out in the manner as described with reference to the embodiment according to FIGS. 1 to 4. On raising of the plough into its inoperative position the tool 46 pivots forward afresh under the action of the spring 50, so that the springs 31 and 32 are tensioned afresh and effect the folding of the lateral members 2.

Thanks to the invention it is possible, without intervention by the tractor driver, to effect the opening out of the plough and its automatic refolding at the beginning and end respectively of a piece of work, also centering of the said plough in the plantation rows, especially upon sloping terrains.

Furthermore in the case where high-clearance, straddle-type tractors are used, it is possible to work several plantation rows at the same time, so as to obtain a significant time saving and thus great labour economy.

The invention is not of course limited to the form of embodiment as described and as represented in the accompanying drawings. Modifications remain possible, especially from the point of view of the constitution of the various elements, or by substitution of technical equivalents, without thereby departing from the scope of protection of the invention.

What is claimed is:

1. A plough for earth working between rows of plants, comprising a movable chassis, horizontally swingable members carried by the chassis, tool holders carried by the horizontally swingable members for holding tools to plough the earth, means to swing the horizontally swingable members toward and away from each other to decrease and increase, respectively, the width of the earth to be ploughed according to the distance between the plants in the rows, and means for centering the plough on laterally inclined ground, said centering means comprising a ground-engaging member carried by the chassis, that swings about a vertical axis in one direction or the other upon lateral tilting of the chassis on inclined ground, and linkage mechanically interconnecting said ground-engaging member and said horizontally swingable members to move both said horizontally movable members laterally in a direction opposite to the direction in which the chassis tilts.

2. A plough as claimed in claim 1, said centering means comprising an L-shaped member having two interconnected legs, means pivotally interconnecting the L-shaped member at the intersection of the legs to the chassis for horizontal swinging movement, means mechanically connecting one said leg to said groundengaging member, and means pivotally interconnecting the other said leg to both of said horizontally swinging members.

3. A plough as claimed in claim 2, said means interconnecting said other end of said L-shaped member to both of said horizontally swinging members comprising a bar to the middle of which one end of said other leg is pivotally interconnected, and two connection bars pivotally interconnecting the ends of the first-mentioned bar to said horizontally swinging members.

4. A plough for earth working between rows of plants, comprising a movable chassis, the chassis having a central beam extending lengthwise thereof, a first cross member at the forward part of the beam, a second cross member at the rear part of the beam, horizontally swingable tool-carrying members pivotally mounted on said rear cross member and extending forwardly from said rear cross member toward said forward cross member, means for laterally swinging said horizontally swingable members toward and away from each other in response to the distance between said rows of plants, the beam extending forwardly of said forward cross member and terminating in a stop, and a hitch bar mounted on said beam between said forward cross member and said stop such that it can move longitudinally and pivot on said beam with respect thereto between said stop and said forward cross bar.

5. A plough for earth working between rows of plants, comprising a movable chassis, horizontally swingable members mounted on the chassis for movement toward and way from each other, tool holders carried by the horizontally swingable members for holding earth working tools, double-acting hydraulic rams carried by the chassis for swinging the horizontally swingable members toward and away from each other according to the distance between rows of plants, hydraulic distributors for controlling the action of said rams, and distributors having horizontally swingable forks for controlling the action of said distributors, rollers slidable in said forks, and means responsive to the position of said plants in said rows to move said rollers horizontally to swing said forks to actuate said distributors to swing said horizontally swingable members toward or away from each other.

6. A plough for earth working between rows of plants, comprising a movable chassis, horizontally swingable members mounted on the chassis for movement toward and away from each other, tool holders carried by the horizontally swingable members for holding earth working tools, double-acting hydraulic rams carried by the chassis for swinging the horizontally swingable members toward and away from each other according to the distance between rows of plants, hydraulic distributors for controlling the action of said rams, parallelogram linkages carried by said chassis, means mounted on said parallelogram linkages to operate said distributors, spring means acting on said parallelogram linkages, a hitch bar for towing said plough, said hitch bar being mounted on said chassis for limited longitudinal movement relative to the chassis whereby said hitch bar occupies a forward position relative to the chassis upon towing the chassis and a rearward position relative to the chassis when the chassis is at rest, and means interconnecting said hitch bar and said spring means whereby said spring means, in the forward towed position of the hitch bar, move said parallelogram linkages in a direction to actuate said hydraulic distributors so as to swing said horizontally swingable members away from each other, and said spring means so as to actuate said hydraulic distributors to swing said horizontally swingable members toward each other when the hitch bar does not exert towing force on the chassis in the rearward position of the hitch bar, and move said parallelogram linkages in an opposite direction to actuate said hydraulic distributors so as to swing said horizontally swingable members toward each other.

* * * * *